Dec. 8, 1953
W. A. GERHART
2,661,848
OIL FILTER CONSTRUCTION
Filed April 12, 1951
3 Sheets-Sheet 1
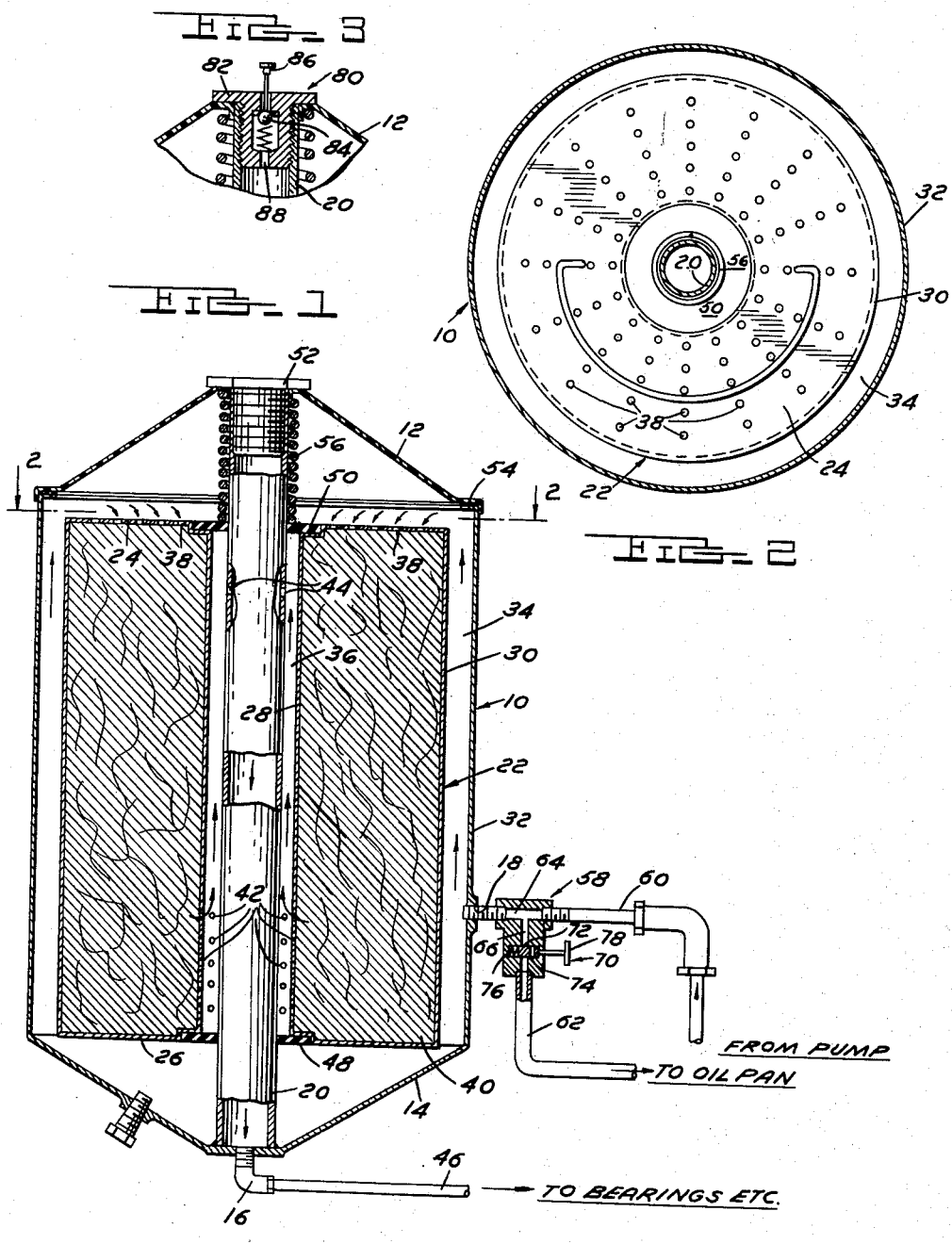
INVENTOR.
WILLIAM A. GERHART
BY
Barnes, Kisselle, Laughlin & Raisch
ATTORNEYS Dec. 8, 1953
W. A. GERHART
2,661,848
OIL FILTER CONSTRUCTION
Filed April 12, 1951
3 Sheets-Sheet 2
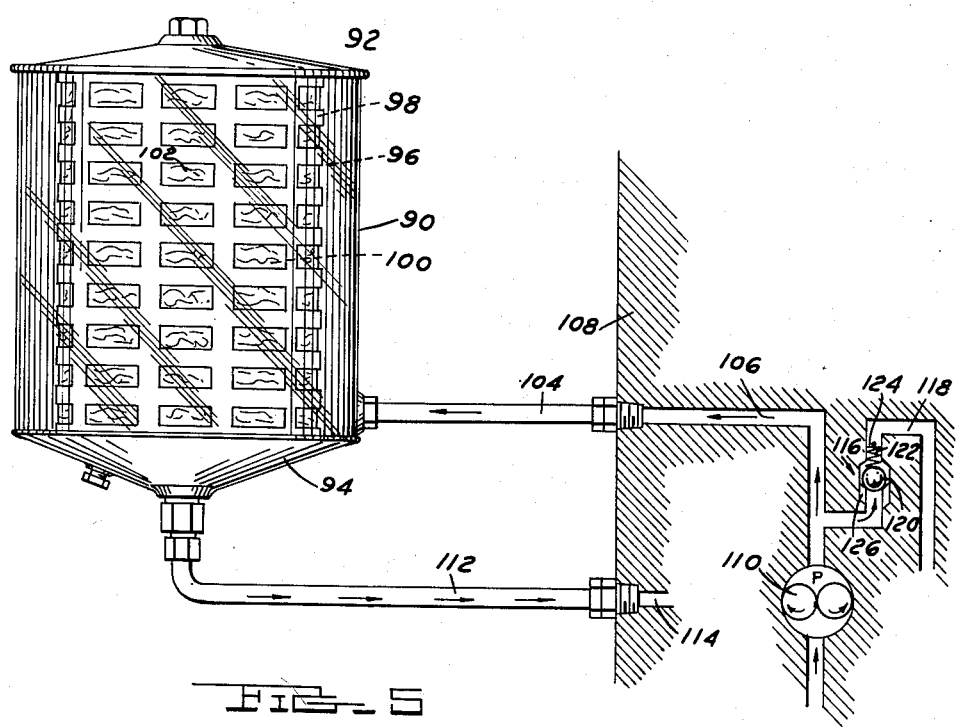
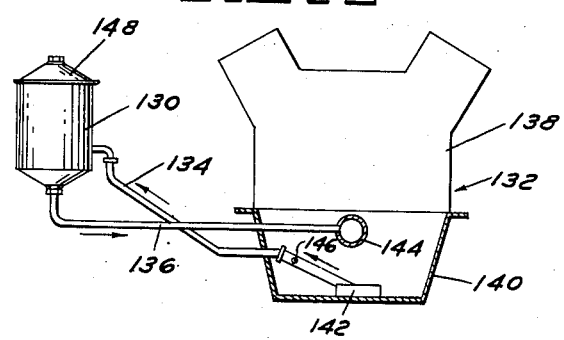
INVENTOR.
WILLIAM A. GERHART
BY
ATTORNEYS

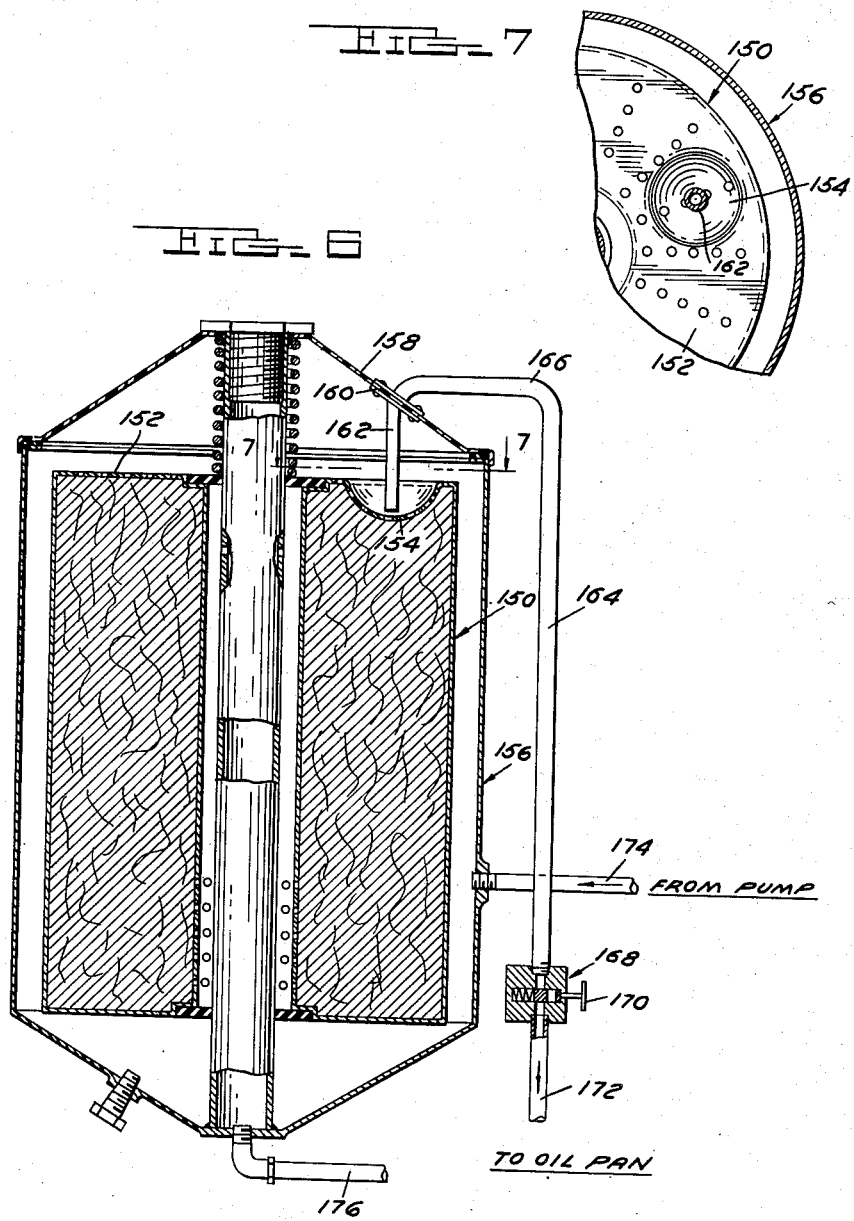

Patented Dec. 8, 1953

2,661,848

UNITED STATES PATENT OFFICE 2,661,848

OIL FILTER CONSTRUCTION

William A. Gerhart, Harbor Springs, Mich.

Application April 12, 1951, Serial No. 220,663

1 Claim. (Cl. 210—166)

This invention relates to an oil filter for an internal combustion engine and more particularly to an oil filter arrangement which permits a ready inspection of the condition of the filter cartridge within the oil filter casing.

The conventional oil filter with which I am familiar comprises a tubular metal casing provided with a top metal cover plate for closing the upper end of the casing. A filter cartridge is disposed within the casing and the casing is provided with an inlet which connects with an oil line from the oil pump of the engine and is also provided with an outlet connected with the oil line leading to the various lubricating orifices of the engine. When it is desired to inspect the condition of the cartridge to determine whether it should be replaced by a new cartridge it is necessary to remove the top cover plate and withdraw the cartridge from within the casing in order to examine the extent to which sludge and the like has accumulated on and in the oil filter cartridge. In the case of automobiles this inspection is usually performed by the service station attendant. However, since the present filter construction renders inspection of the cartridge not only time consuming but also a rather messy procedure, this inspection service is usually rendered too infrequently.

I am aware that it has been proposed heretofore to form the filter casing of a transparent material. This would enable visual inspection of the filter cartridge without requiring its removal from the casing. Although the provision of the transparent casing would eliminate the necessity for removing the cartridge from the filter casing, this method of inspection introduces a further problem. When an internal combustion engine is turned off, a super-atmospheric pressure obtains in the filter casing for a short time. Even after the pressure subsides to atmospheric, immediate visual inspection of the cartridge through the transparent casing is not possible because the filter casing is still substantially filled with oil. In order to see the condition of the cartridge it would be necessary to wait until the oil drained out of the casing and back through the oil lines to the crankcase. Since conventional filters are not provided with vents or the like, it takes quite some time (3, 4 or even 5 minutes) for the oil to drain out of the filter and through the relatively small orifices in the oil lubricating system back to the crankcase of the engine. Thus, the provision of the transparent casing would require letting the engine stand for a considerable length of time after being turned off before the cartridge could be viewed through the transparent casing in order to determine its condition of use.

It is an object of this invention to provide a filter construction for an internal combustion engine which enables visual inspection of the filter cartridge without removing the cover plate from the casing and within a relatively short time after the engine is turned off.

A further object of the invention is to provide means associated with the oil filter which promote draining of the oil from the filter so that the length of time required for the oil in the filter to return to the crankcase is reduced to a minimum.

A further object of the invention resides in the provision of an oil filter cartridge which is constructed such that only a small amount of oil is required to be drained from the filter casing to permit visual inspection of the filter.

A still further object of the invention resides in the provision of a transparent cover plate for a filter casing and a valve means which, with a minimum of time and expense, can be applied to oil filters of present-day construction to permit ready visual inspection of the filter cartridge without requiring removal of the cartridge from the casing.

Another object of the invention is to provide means which can be sold as a package unit for converting filters of present-day construction into filters which will drain readily and quickly after the engine is turned off.

In the drawings:

Fig. 1 is a vertical sectional view through the improved oil filter of my invention.

Fig. 2 is a sectional view along the lines 2—2 in Fig. 1.

Fig. 3 is a fragmentary sectional view of another form of valve means for the filter.

Fig. 4 shows an oil filter connected with an automatic relief valve.

Fig. 5 is a somewhat diagrammatic view showing a further modification of the venting or pressure relieving means for the oil filter.

Fig. 6 is a sectional view of another modified form of oil filter.

Fig. 7 is a fragmentary sectional view along the lines 7—7 in Fig. 6.

There is illustrated in Fig. 1 an oil filter having an outer casing 10 which is closed at its upper end by a removable cover plate 12. Casing 10 has a conically shaped bottom wall 14 provided with an outlet fitting 16 at the lower end thereof. The side wall of the casing is fashioned with an oil inlet 18. An upstanding pipe 20 within casing 10 is secured to the bottom wall 14 of the casing as by welding or the like. Pipe 20 is disposed within the casing such as to provide an outlet passage from the casing to outlet fitting 16.

The filtering means is in the form of a tubular cartridge 22 provided with top and bottom walls 24 and 26, respectively, and with concentric inner and outer annular side walls 28 and 30. Cartridge 22 is dimensioned such that, when it is positioned within casing 10, the side wall 30 is spaced inwardly of the side wall 32 of casing 10 to provide an annular passage 34 between the casing and the cartridge. The inner wall 28 of casing 10 defines an axial passage through the cartridge which is larger in diameter than the external diameter of pipe 20 whereby to provide an annular outlet passage 36 between the cartridge and the pipe 20.

The side wall 30 of cartridge 22 is substantially imperforate while the top wall 24 of the cartridge is provided with a plurality of openings 38. The cartridge is filled with a material 40 suitable for filtering oil. Around the lower portion of inner wall 28 cartridge 22 is provided with series of openings 42 out of which oil flows from the container. Adjacent its upper end and within the axial extent of cartridge 22, pipe 20 is formed with a pair of opposed openings 44 by means of which the filtered oil in passage 36 flows into pipe 20 and out of the filter through outlet fitting 16. A length of tubing 46 connects fitting 16 with the oil lines for supplying oil to the bearings, etc. (not shown).

In order to provide for the proper flow of oil through the filter, gaskets 48 and 50 are arranged around pipe 20 in sealing engagement with the upper and lower walls 24 and 26, respectively, of the cartridge. At its upper end pipe 20 is internally threaded for the reception of a threaded plug 52 which serves to hold cover plate 12 on the casing. A rubber gasket 54 may be employed for providing a leak-proof joint between the cover plate 12 and the casing. Cover plate 12 in this form of the invention is formed of a transparent material. A spring 56 acts between the inner face of cover 12 and the top face of cartridge 22 through the medium of gasket 50 to bias the cartridge to the position illustrated in Fig. 1.

In conventional filters with which I am familiar the inlet 18 of the casing 10 is usually connected directly with the oil line leading from the pump in the crankcase or oil pan of the engine. In my arrangement I connect with inlet 18 a T-shaped valve fitting 58 which connects on the one side with the oil line 60 leading from the oil pump (not shown) to the filter casing and on the other side with an oil line 62 leading from the casing 10 to the oil pan or crankcase of the engine. Fitting 58 is formed with two intersecting passages 64 and 66. Passage 64 is in open communication with oil line 60 and casing 10. Passage 66 is normally closed and controlled by a valve 70 which includes a plunger 72 having a passage 74 therein. Plunger 72 is normally biased by a spring 76 to a position wherein the body portion of the plunger intersects and closes passage 66. Plunger 72 is provided with a push button member 78 which is arranged to be manually depressed so as to align passage 74 with passage 66.

When the engine is operating oil flows from the pump (not shown) through the line 60, passage 64 in fitting 58, and into casing 10. Since the outer walls of cartridge 22 are imperforate with the exception of the opening 38 in the top wall of the cartridge, the oil travels the course generally indicated by arrows in Fig. 1. The oil flows upwardly in the annular space 34 between walls 32 and 30 to the upper end of the filter cartridge. It then flows downwardly through the openings 38 in the top wall 24 of the cartridge and downwardly through the filter material 40 in the cartridge. The filter material 40 removes the foreign material in the oil and the filtered, relatively clean oil flows out of the cartridge through openings 42 and upwardly through the annular space 36 between pipe 20 and wall 28. Since the annular passage 36 is closed at both its upper and lower ends by gaskets 48 and 50, the oil under pressure passes through openings 44 in the pipe 20 and downwardly through pipe 20 and outlet fitting 16 to the oil line 46 which extends to the various lubricating orifices in the engine, such as at the bearings and the like.

When the motor is stopped it will be appreciated that casing 10 and cartridge 22 are substantially completely filled with oil under pressure. If the motor is permitted to remain idle, this oil will gradually drain from the casing through the lines 46 and 60. However, since both of these lines are more or less restricted, this drainage occurs very slowly. The oil draining through line 46 has to flow through the tiny lubricating orifices around the bearings and the like and the oil draining through line 60 has to flow back through the oil pump.

I have found that the oil within the casing can be drained very rapidly by simply depressing push button 78 to align passage 74 in plunger 72 with passage 66 in fitting 58. When these passages are aligned the oil flows freely through inlet 18 and fitting 58 through oil line 62. Since conduit 62 simply leads to the oil pan, the flow in this conduit is relatively free and not impaired by any restrictions or by back pressure which is the case with lines 46 and 60. After sufficient oil has drained from casing 10 to expose the top portion of cartridge 22 push button 78 may be released, the top wall 24 of cartridge 22 can be viewed readily through the transparent cover plate 12 to determine the condition of the filter cartridge 22. The construction of the cartridge 22, it will be noted, is such that the top wall of the cartridge will indicate the condition of the cartridge, since, when the cartridge becomes dirty and clogged, the oil sludge will accumulate on this top wall.

In Fig. 3 there is illustrated a different means which may be employed for promoting the draining of oil from the oil filter casing illustrated in Fig. 1. In this embodiment there is provided a vent generally referenced 80. This vent is preferably contained within the plug 82 which is threadedly engaged with the upper end of pipe 20 to retain transparent cover plate 12 in position on casing 22. The vent 80 is preferably in the form of a spring-biased ball check valve 84 provided with a push button 86. The check valve 84 is arranged to normally close a passage 88 in plug 82 which opens at one end to atmosphere and at the other end to the interior of pipe 20.

I have found that the oil within casing 22 will drain much more rapidly from the casing even through the conventional inlet and outlet lines 60 and 46, respectively, when the casing is vented to atmosphere. The vent 80 illustrated in Fig. 3 therefore provides a very economical and conveniently positioned means for promoting the return of oil from the filter casing to the crankcase so that the condition of the cartridge can be ascertained within a minimum of time after the engine is turned off. When it is desired to check the condition of the cartridge with the arrangement illustrated in Fig. 3 the service station attendant merely depresses the push button 86 after the engine has been stopped and keeps the push button in a depressed condition until the oil level in the filter casing has receded to a point below the apertured top wall 24 of the cartridge.

In Fig. 4 there is shown a modified arrangement wherein the oil filter includes a transparent tubular casing 90 provided with metal cover plates 92 and 94 at the upper and lower ends thereof. The cartridge 96 within casing 90 may be of standard construction and has its outer side wall 98 formed with a plurality of openings 100 through which the oil may flow into the filter material 102 within the cartridge. An oil inlet line 104 connects the casing with an oil passage 106 within the motor block 108. Passage 106 is on the outlet side of the oil pump 110. The oil outlet line 112 is connected at one end into the lower end of the oil filter casing 90 and at its other end outlet line 112 connects with a passage 114 in the motor block which leads to the various lubricating orifices.

In this arrangement quick draining of the oil in the casing 90 is promoted by the check valve generally referenced 116. Valve 116 is positioned in an oil line 118 which connects with passage 106 at one end and which discharges freely into the crankcase (not shown) at the other end. This check valve may be of conventional construction and includes a ball member 120 biased by a light spring 122 to a position opening port 124. In the open position ball member 120 seats upon a plurality of fins 126 in passage 118 which permits the oil to flow around the ball member 120 through port 124 and through passage 118 to the crankcase.

Spring 122 is selected such that, when the engine is running, the oil pressure produced by pump 110 is sufficient to cause ball member 120 to compress spring 122 and close port 124 so that the oil flow is through line 106, through the oil filter, through the cartridge 96, back to the engine block through line 112, and to the lubricating orifices through lines 114. However, when the motor is stopped pump 110 ceases to pump oil under pressure and ball member 120 is biased by spring 122 to the open position. The oil in casing 90 is therefore free to return to the crankcase through line 104, passage 106, and passage 118. In this manner pump 110 is by-passed and the casing 90 is drained readily, since the oil flows freely through line 118.

The arrangements illustrated in Figs. 1 through 4, it will be noted, are adapted to be sold as packaged units to replace conventional filters already installed on automotive vehicles. The check valve 116 illustrated in Fig. 4 can be connected into the oil inlet line from the engine block and need not be positioned within the block itself. The oil line 118 can be arranged exteriorly of the motor block so as to drain into the crankcase through the conventional dip-stick tubing or the oil filling spout.

The arrangement illustrated in Fig. 5 is primarily adapted for incorporation in the engine itself as distinguished from a replacement unit such as is illustrated in Figs. 1 through 4. In this arrangement the oil filter 130, of the type illustrated in Fig. 1, is connected with the engine 132 by an inlet oil line 134 and an outlet oil line 136. The engine includes a block 138 to which is secured the oil pan 140. The inlet line 134 is connected to the pump 142 within the oil pan and the outlet line 136 leads to the bearings which are arranged to be lubricated. For the purpose of promoting quick draining of the oil in filter 130, I have found that one or more small openings 146 may be formed in oil line 134. Opening 146 is formed in that portion of oil line 134 which is disposed within the oil pan 140. A portion of the oil which is pumped by pump 146 will squirt out through opening 146. However, the flow of oil through filter 130 in an amount necessary for proper lubrication can be insured by simply increasing the capacity of pump 142.

With the arrangement illustrated in Fig. 5 it will be appreciated that as soon as the engine is stopped, the oil in filter 130 will drain freely through line 134 and back to the oil pan 140 through openings 146. Therefore, after the engine has been stopped for only a relatively short period of time, the oil level in filter 130 will recede to a point enabling the visual inspection of the filter cartridge within the filter through the transparent cover plate 148.

In the construction illustrated in Figs. 6 and 7 the filter cartridge 150 is constructed generally along the lines of the cartridge 22 illustrated in Figs. 1 and 2 with the exception, however, that the top wall 152 is provided with a well 154. Well 154 is simply a depression formed in top wall 152, the bottom of the depression being disposed at a level lower than the plane of top wall 152. Casing 156 is substantially the same as the casing illustrated in Figs. 1 and 2 and the cover plate 158 is formed of a transparent material as is the cover plate 12. Cover plate 158 is provided with a fitting 160 which, on the underside of the cover, has connected thereto a short piece of tubing 162 which is arranged to dip into well 154. The lower end of tubing 162 is spaced above the bottom of well 154 but below the plane of top wall 152 of cartridge 150. On the outer side of cover 158 fitting 160 is connected with a conduit 164 which extends laterally from cover 158 and which is bent downwardly as at 166. The lower end of conduit 164 terminates at the level of the lower end of cartridge 150 and is provided with a valve 168 having the same general construction as valve 70 illustrated in Fig. 1. Valve 168 is provided with a spring-biased plunger 170 which when actuated is adapted to establish communication between conduit 164 and a conduit 172 which is connected with the oil pan of the engine such as through the dip stick holder (not shown). Oil from the oil pump of the engine is conducted into casing 156 through an inlet conduit 174 and the filtered oil is discharged from the filter through an outlet conduit 176 which connects with the oil lines for supplying oil to the bearings, etc. for lubrication.

The oil flow through the filter construction illustrated in Figs. 6 and 7 is generally the same as that described with reference to Figs. 1 and 2. The base difference between these two constructions is the manner in which the filter casing is quickly drained to enable viewing the top wall 152 of cartridge 150 to ascertain the condition of cleanliness of the filter cartridge. In the arrangement illustrated in Figs. 6 and 7 it will be observed that, during normal operation of the engine, well 154 and conduits 162 and 164 will be filled with oil which flows into the casing through inlet conduit 174. When the engine is stopped and it is desired to inspect the filter cartridge 150, the service station attendant merely depresses plunger 170 to permit the oil in conduit 164 to flow downwardly through conduit 172 and to the oil pan. It will be observed that the oil flowing downwardly in conduit 164 produces a syphoning action in well 154 and the oil in the upper portion of the filter will flow out through conduits 162 and 164 until the level of the oil recedes to below the lower end of conduit 162. Since the lower end of conduit 162 is disposed below the level of top wall 152, it is obvious that within a matter of seconds the oil in the upper portion of the filter will be drained to a level below the top wall 152 and the condition of the filter can thus be readily ascertained by viewing it through the transparent cover plate 158.

Thus it will be seen that I have provided a filter construction for an internal combustion engine which renders the inspection of the filter cartridge a relatively simple operation. The provision of a transparent window on the filter casing in combination with the means for promoting the return of oil from the filter to the oil pan provides an arrangement which enables quick inspection of the cartridge without soiling in any way the hands of the person inspecting the filter. Furthermore, I have provided a filter cartridge which is designed to permit the inspection thereof much more feasible by designing the cartridge such that sludge and the like accumulate on the top wall of the filter. With this arrangement it will be appreciated that as soon as the oil level in the filter recedes to a point below the top wall of the cartridge the condition of the cartridge may be readily ascertained by viewing the cartridge through the transparent top cover plate on the filter.

I claim:

An oil filter for an internal combustion engine comprising a casing having an inlet and an outlet for conducting oil through said casing, said casing having an upper end portion formed at least in part of a transparent material, a filter cartridge in said casing, said filter cartridge having a generally flat top wall disposed adjacent said transparent end portion, means forming a well in said top wall the lower end of which is disposed at a level below the plane of said top wall, said top wall being apertured to admit oil to the interior of said cartridge, and conduit means having one end disposed within said well below the level of said top wall and having another end disposed exteriorly of said casing, said last mentioned end being disposed at a level below the bottom of said well and being provided with valve means for opening and closing said last mentioned end of said conduit whereby when said casing and said conduit are filled with oil and said valve is actuated to open the oil flowing downwardly through said conduit produces a syphoning action on the oil within the said well and thereby causes the oil in said casing to drain out of said casing until the oil in said casing recedes to a level below the plane of said top wall.

WILLIAM A. GERHART.

References Cited in the file of this patent

UNITED STATES PATENTS

| Number | Name | Date |
| --- | --- | --- |
| 1,942,549 | Hampton | Jan. 9, 1934 |
| 2,110,124 | Fitzgerald | Mar. 8, 1938 |
| 2,134,385 | Winslow | Oct. 25, 1938 |
| 2,276,118 | Taylor | Mar. 10, 1942 |
| 2,473,032 | Le Clair | June 14, 1949 |
| 2,554,748 | Lewis | May 29, 1951 |